(No Model.)

A. W. CADMAN.
Valve.

No. 237,810. Patented Feb. 15, 1881.

Witnesses
R. C. Wrenshall
Jno. K. Smith

Inventor
Alexander W. Cadman
by his Attys
Bakewell & Kerr

UNITED STATES PATENT OFFICE.

ALEXANDER W. CADMAN, OF PITTSBURG, PENNSYLVANIA.

VALVE.

SPECIFICATION forming part of Letters Patent No. 237,810, dated February 15, 1881.

Application filed September 15, 1880. (No model.)

*To all whom it may concern:*

Be it known that I, ALEXANDER W. CADMAN, of Pittsburg, in the county of Allegheny and State of Pennsylvania, have invented a new and useful Improvement in Valves; and I do hereby declare the following to be a full, clear, and exact description thereof.

Heretofore angle globe-valve shells have been constructed with a seat cast around the influent opening, and the valve was inserted through an opening from above of substantially the same size as the influent opening. This valve had to be seated on a seat inside of the shell, and necessarily the seat was smaller than the opening. The seat was made no wider than was absolutely necessary to afford a bearing for the valve, and the result of this was that the extreme edge only of the valve could find a bearing on the seat, and this caused the washer or elastic facing of the valve and the edge of the seat to cut out very rapidly, and made the valve less secure than a wider seating would have done. Of course, by changing the form of the shell and making a very wide opening at the top a wider valve might have been inserted and a wider seat made beyond the sides of the influent opening; but such change would not be consistent with economy of manufacture nor with the beauty of the shell, as it would greatly increase its size and the amount of material used without corresponding benefit, and would destroy its symmetrical shape. A result of the rapid cutting out of the washer and seat in the old form of valve was that the valve was often leaking and required to be taken off to renew the washer and seat.

My invention consists in providing the shell with a removable lower section or coupling piece having the valve-seat cast therewith, which section, being united to the shell, may be unscrewed therefrom for the purpose of inserting the valve or renewing the seat or washer. This construction enables me to introduce a wide valve into the shell and to use a broad seat.

To enable others skilled in the art to make and use my invention, I will now describe its construction and mode of operation with reference to the accompanying drawings, in which—

Figure 1:
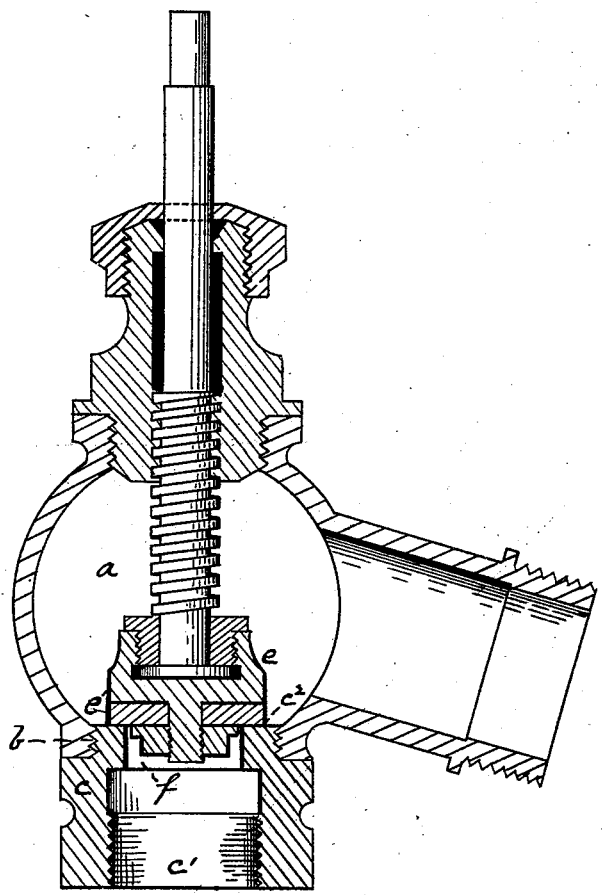
Figure 2:
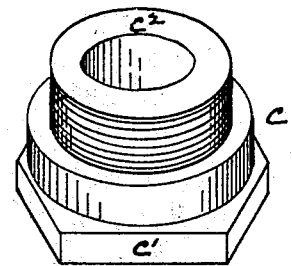

Figure 1 is a sectional view of a valve of my improved construction. Fig. 2 is a perspective view of the detachable lower section of the shell comprising the seat and the lower coupling.

Like letters of reference indicate like parts in each.

The shell $a$ has a large opening, $b$, in its lower side. This opening is threaded internally, and in it is screwed the lower section, $c$, composed of the coupling $c'$ and the valve-seat $c^2$. The opening $b$ is large enough to permit of the insertion of the valve $e$, which is wider than the valves used heretofore in similar-sized shells of the old construction, being wide enough to cover the influent opening $f$, and in addition thereto have a broad bearing on the wide seat $c^2$. The valve has a leather or similar washer, $e'$, on its lower end. The result of this construction is that the washer, having a broad even bearing on the seat $c^2$, neither wears rapidly itself nor wears the seat rapidly, and also that it makes a closer and more reliable valve. In case, after the valve is screwed onto the branch pipe by the coupling $c'$, it becomes necessary to repair it or renew the washer, it can be removed by unscrewing the shell $a$ from the piece $c$ and leaving the latter on the branch pipe. Then the washer can be got at through the large lower opening $b$. The parts $a$ and $c$ are both cast of any suitable material.

The advantages of my invention are its cheapness, utility, economy of construction, the saving of washers and valve-seats, and facility of repairs.

In case the valve is used with steam the wide seat $c^2$ should be tapering or conical.

I am aware that pumps have been devised with a screw-coupling for connecting the piston-chamber with the induction-tube, which coupling was provided with a seat for the lower pump-valve, and therefore do not claim, broadly, a screw-coupling formed in a single piece with a valve-seat; but What I do claim, and desire to secure by Letters Patent, is—

An angle globe-valve shell having a detachable lower coupling cast in one piece with the valve-seat, substantially as and for the purposes described.

In testimony whereof I have hereunto set my hand.

ALEX. W. CADMAN.

Witnesses:
R. H. WHITTLESEY,
T. B. KERR.